United States Patent [19]
Okada

[11] 3,754,827
[45] Aug. 28, 1973

[54] DUPLICATING EQUIPMENT WITH A MOVABLE GRID

[75] Inventor: Tomio Okada, Asaka-shi, Saitama, Japan

[73] Assignee: Fuji Photo Film Co., Ltd., Kanagawa, Japan

[22] Filed: Nov. 15, 1971

[21] Appl. No.: 198,538

[30] Foreign Application Priority Data
Nov. 16, 1970 Japan.............................. 45/113730

[52] U.S. Cl. .............................................. 355/113
[51] Int. Cl. ............................................ G03b 27/04
[58] Field of Search ........................... 355/113–121, 52; 350/127

[56] References Cited
UNITED STATES PATENTS
2,198,115  4/1940  John ..................................... 355/51
3,016,785  1/1962  Kapany ................................. 355/52
2,780,136  2/1957  Erban ................................. 350/127
3,277,807  10/1966  Cranskens ........................... 355/121

Primary Examiner—John M. Horan
Attorney—Richard C. Sughrue, Donald E. Zinn et al.

[57] ABSTRACT

In duplicating equipment having a light source radiating scattered light such as fluorescent lamp, a grid made of fine partition plates is provided to decrease the scattered light. To prevent the shadow of the grid from appearing in the duplicated image, the grid is shifted during the time of exposure. As a specific example, therefore, the grid can be supported by pin members, each of which is provided eccentrically on supporting disks rotated by a motor, so that the grid is circularly shifted.

4 Claims, 2 Drawing Figures

3,754,827

DUPLICATING EQUIPMENT WITH A MOVABLE GRID

BACKGROUND OF THE INVENTION

1. Field of the Invention

The present invention relates to duplicating equipment, and especially to equipment for close contact duplication of a micro film, that requires especially high resolution. In particular, the present invention relates to improvements in duplicating equipment in which a light source radiating scattered light, such as a fluorescent lamp, is used as an exposure light source for duplication.

2. Description of the Prior Art

In the prior art, duplicating equipment having exposure light source, subject to scattering, there is often a remarkable deterioration of resolution on the duplicated image. A fixed fine partition plate, also referred to as a grid which are open or hollow, has been heretofore provided between the exposure light source and sensitive material so as to decrease the scattering of light as much as possible. It has been, however, difficult to obtain an overall satisfactory duplicated image, because the parts of the image behind the partition plates, corresponding to their shadows, are shaded due to less quantity of light. Particularly in the duplication of a micro film, it has been a problem because the fine shaded parts are so enlarged as to appear as perceptible defects when the duplicated image is magnified for observation. In other words, the light from the light source does not directly reach a part of the sensitive material because of interception caused by the plates of the grid 7, and the part is barely exposed by scattered or reflected light from the surroundings. This causes the difference between the degree of exposure on the part and that on the other part, i.e., nonuniformity of exposure, and the thicker the grid plate, the greater the difference.

SUMMARY OF THE INVENTION

The present invention overcomes the above-described defects and improves the prior art duplicating equipment. Accordingly, an object of the present invention is to provide duplicating equipment in which uniform exposure is accomplished.

For this purpose, according to the present invention, the grid is slowly shifted during the time of exposure. The grid is, further, shifted circularly according to the specific embodiment thereof.

BRIEF DESCRIPTION OF THE DRAWINGS

The duplicating equipment according to the present invention will be best understood from the following description, on reference to the accompanying drawings in which.

DESCRIPTION OF THE PREFERRED EMBODIMENT

Figure 1:
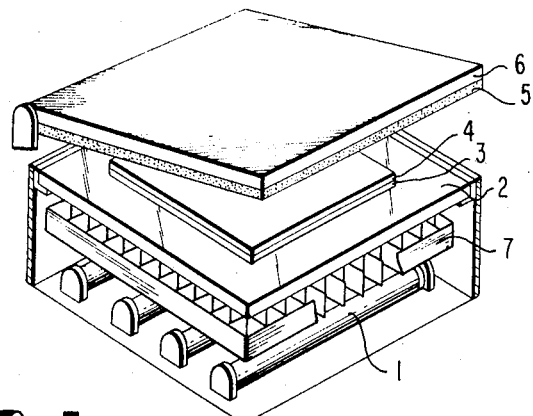
FIG. 1 is a perspective view of the prior duplicating equipment to show the inner construction thereof.
Figure 2:
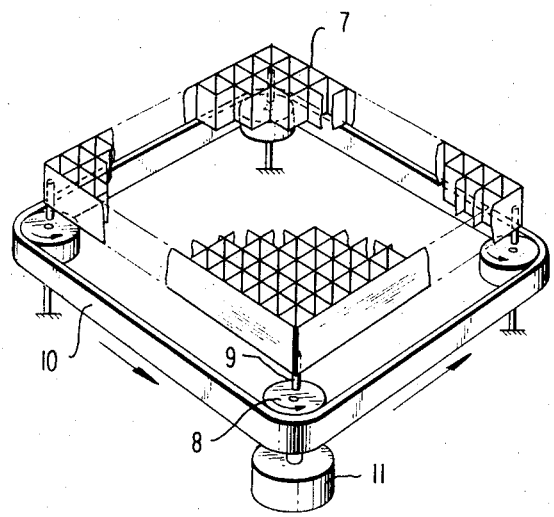
FIG. 2 is a perspective view of the grid shifting mechanism according to the present invention, wherein showing the main part thereof.

In FIG. 1, there is shown a piece of duplicating equipment including a grid. A light source 1 of, for example, fluorescent lamps, or low-voltage mercury-arc lamps of the same sort, is provided therein and a deck glass 2 is provided at a distance therefrom. An original film 3 and a duplicating film 4, superposed in close contact, are put on the deck glass 2 and pressed by a pressing panel 6 through a cushion member 5. Between the light source 1 and the deck glass 2, a grid 7, e.g. an open or hollow honeycomb construction is provided. The grid 7 according to the present invention, is made movable, not fixed. To cite one example of the movable mechanism therefore as a specific embodiment of the present invention, rotatable supporting pinions or disks 8 are provided corresponding to the four corners of the grid 7, as shown in FIG. 2, and on each supporting disk 8 a pin member 9, which is fitted into one of the mounting holes in the grid, is uprightly fixed at a distance from its center of rotation, i.e., eccentrically. On the other hand, the four supporting disks 8 are connected by a belt 10 and driven by a motor 11. Thus, the supporting disks 8 are simultaneously rotated as the motor 11 rotates, and accordingly, the grid 7 is circularly shifted as the pin members 9 are circularly moved. If the grid 7 is shifted at least one turn during the time of exposure, it will be found that the shadow of the grid 7 does not appear in the duplicated image and the degree of exposure is averaged to be uniform overall. Thus, it will be possible to accomplish the uniformity of exposure and accordingly to prevent the deterioration of resolution. It should be understood that light is one specific application of radiating energy and that other forms of energy could conceivably be applicable and benefit from the present invention.

Though only a specific embodiment of the grid assembly is shown in the above description, still other modifications will be apparent to those skilled in the art without departing from the scope and the spirit of the present invention. Accordingly, the present invention is to be defined by the accompanying claims and is not to be limited to the illustrated specific embodiment of the present invention.

What is claimed is:

1. In duplicating equipment having a source of radiating energy and mounting means for holding material sensitive to said radiating energy, the improvement comprising:

an open grid for decreasing the scattering of said radiating energy between said source and said sensitive material, and means for shifting said grid relative to said source of radiating energy during the exposure of said sensitive material, said shifting means including a plurality of rotatable supporting members, said supporting members comprised of circular discs eccentrically supported for rotation, a connecting member connecting said grid to each of said supporting members, an endless belt contacting said discs, and a motor for driving said belt, whereby said sensitive material will not be adversely affected by the presence of said grid during the exposure to said radiating energy.

2. Duplicating equipment as defined in claim 1, where the radiating energy is light.

3. Duplicating equipment as defined in claim 1, where said grid is a honeycomb structure of rectangular configuration.

4. Duplicating equipment as defined in claim 1, further including a glass plate for supporting said sensitive members and a cover plate having a cushion member for bearing against said sensitive material.

* * * * *